United States Patent [19]

Nagashima et al.

[11] Patent Number: 4,646,179
[45] Date of Patent: Feb. 24, 1987

[54] FLEXIBLE MAGNETIC DISC, POSITIONING APPARATUS AND METHOD PERMITTING IMPROVED HEAD CONTACT

[75] Inventors: Yasuo Nagashima, Kaisei; Akira Kasuga, Odawara, both of Japan

[73] Assignee: Fuji Photo Film Co., Ltd., Kanagawa, Japan

[21] Appl. No.: 613,066

[22] Filed: May 22, 1984

[30] Foreign Application Priority Data

May 23, 1983 [JP] Japan .................................. 58-89099

[51] Int. Cl.$^4$ .................. G11B 5/016; G11B 5/012; G11B 23/03; G11B 5/54
[52] U.S. Cl. .......................................... 360/99; 360/97; 360/133; 360/105; 360/135; 428/336; 428/415
[58] Field of Search .................. 360/97, 98, 99, 133, 360/130.2, 130.21, 137, 135, 130.3; 428/336, 415

[56] References Cited

U.S. PATENT DOCUMENTS

| | | | |
|---|---|---|---|
| 4,074,330 | 2/1978 | Norton et al. | 360/99 |
| 4,171,406 | 10/1979 | Yamaguchi et al. | 428/447 |
| 4,365,258 | 12/1982 | Geyer et al. | 346/137 |
| 4,388,368 | 6/1983 | Hibino et al. | 428/336 |
| 4,388,376 | 6/1983 | Kubota | 360/135 |
| 4,414,592 | 11/1983 | Losee et al. | 360/99 |
| 4,415,942 | 11/1983 | Frosch et al. | 360/135 |
| 4,449,139 | 5/1984 | Geyer et al. | 346/137 |
| 4,466,032 | 8/1984 | Saito | 360/99 |
| 4,537,824 | 8/1985 | Asano et al. | 428/323 |

FOREIGN PATENT DOCUMENTS

| | | | |
|---|---|---|---|
| 54-17708 | 9/1979 | Japan | 360/99 |
| 55-157161 | 12/1980 | Japan | 360/99 |
| 57-113466 | 6/1982 | Japan | 360/97 |
| 58-17519 | 2/1983 | Japan | 360/125 |
| 59-33666 | 2/1984 | Japan | 360/137 |

OTHER PUBLICATIONS

IBM Technical Disclosure Bulletin vol. 18, No. 3, Aug. 75, pp. 895–896, "Magnetic Disk Recor. and Transd. Gaps Disposed End-to-End" by A. J. Bowen.
IBM Technical Disclosure Bulletin vol. 6, No. 9, Feb. 64, pp. 57–58 "Pressure Pad for Mag. Heads" by M. f. Bord.

*Primary Examiner*—John H. Wolff
*Assistant Examiner*—Alfonso Garcia
*Attorney, Agent, or Firm*—Birch, Stewart, Kolasch & Birch

[57] ABSTRACT

A flexible magnetic disc for use in combination with a magnetic head assembly which includes a regulator plate and performs magnetic recording or playback by protruding a magnetic head beyond a predetermined support level of a rotatable sheet of magnetic recording medium at least by an amount which is substantially equal to a total thickness of the recording medium. Assuming that the recording medium has a total thickness of t millimeters (mm) and a Young's modulus of E grams per square millimeter (g/mm$^2$), a product of the Youngs's modulus E and the third power of the total thickness t, i.e. Et$^3$, lies in a range between a lower limit of 2.5 g.mm and an upper limit of 36 g.mm inclusive of the lower and upper limits.

12 Claims, 12 Drawing Figures

FIG. 8
(PRIOR ART)
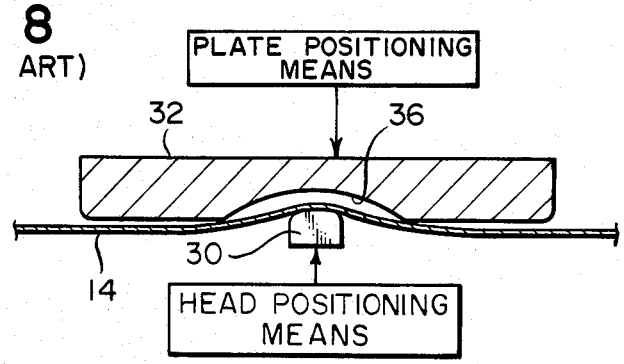
FIG. 9A
(PRIOR ART)
FIG. 9B
(PRIOR ART)
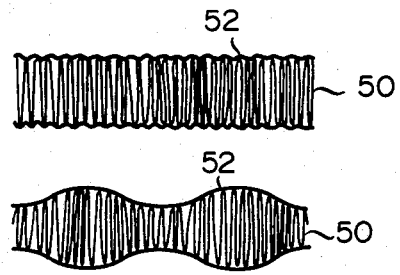
A PERIOD OF FULL
TURN OF DISC
FIG. 10
(PRIOR ART)
FIG. 11
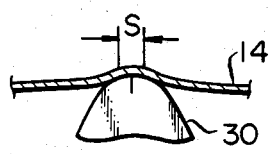
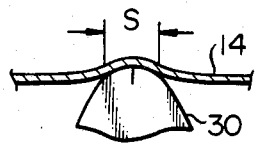

FLEXIBLE MAGNETIC DISC, POSITIONING APPARATUS AND METHOD PERMITTING IMPROVED HEAD CONTACT

The present invention is related to the invention described in copending application Ser. No. 613,065, filed May 22, 1984, said application being assigned to the same assignee as the present invention.

BACKGROUND OF THE INVENTION

1. Field of the Invention

The present invention relates to magnetic disc and, more particularly, to a flexible magnetic disc for use in a system and method which includes a regulator plate and performs magnetic recording or playback by protruding a magnetic head beyond a regulation level of a rotatable sheet of magnetic recording medium.

2. Description of the Prior Art

Generally, a flexible magnetic disc of the type described has a thin disc sheet which is encased in a jacket. During a recording or playback mode of operation, only the thin disc sheet in the jacket is rotated while a magnetic head, or transducer, is held in contact with the disc sheet through an opening formed in the jacket. So long as the disc has a relatively large diameter, it is prevented from swaying or warping when the head is protruded or thrust toward it due to a centrifugal force developing in the disc, allowing the head to stably abut against the disc.

Concerning a disc having a relatively smaller diameter, however, the centrifugal force is smaller than one acting on the larger diameter disc so that protruding or projecting the head toward the disc causes a recording surface of the disc to warp away from the head. Such instability of contact of the head with the disc is brought about in the case where the disc accommodated in a jacket has a small diameter such as about 5 centimeters (cm). Needless to say, accuracy of abutment or contact of the head against the recording surface of the disc is a primary requisite for stable recording or playback of signals. The abovementioned warping, or swaying, of the head degrades the accuracy of abutment and, thereby, prevents signals from being recorded or reproduced with stability.

In light of this, there has been proposed a construction which regulates the warping of a disc sheet away from a head, or toward the back of the disc sheet where the head is absent, when the head is thrust into contact with the disc sheet, as disclosed in Japanese Patent Laid-Open Publication Nos. 113459/1982 and 113460/1982, for example. The regulation is implemented by a regulator plate or board which has a recess so shaped as to regulate or limit warping of the sheet and presses against that part of the back of the sheet which corresponds in position to the head.

However, we have found that the mechanism relying simply on the regulator plate is not always successful to provide desirable contact of a head with the recording surface of a disc sheet.

One of the causes of such unstable head-disc contact is the physical curling of a magnetic disc itself.

The situation concerned with curling will be discussed in relation with a prior art flexible magnetic disc. As shown in FIG. 1, a flexible magnetic disc, generally 10, comprises a jacket 12 in which a magnetic recording sheet 14 is housed. In an exemplary configuration, the jacket 12 may be dimensioned about 5 cm at each side while the sheet 14 may have a diameter of about 5 cm and a thickness of about 40 microns ($\mu$m). A hub, or core, 16 is rigidly mounted on a radially central area of the sheet 14 so that it may be chucked by a rotary drive shaft through a central opening of the jacket 14 in order to impart rotation to the sheet 14. The jacket 12 has an opening 18 which allows the regulator plate and the magnetic head to abut respectively against the opposite surfaces of the sheet 14.

The sheet 14 has such a configuration as one shown in FIG. 2. FIG. 3 shows the sheet 14 in a section along line III of FIG. 2 with the core 16 removed, representing a curled condition of the sheet 14. In FIG. 3, the degree of curling of the sheet 14 is indicated in terms of the height h of the circumferential edge of the sheet 14 measured from a reference plane or level 20. The curl h may be measured by, for example, laying a magnetic sheet gently on a flat plate under a room temperature and humidity condition.

Usually, an auxiliary or additional layer referred to as a "balance coating" is deposited on that surface of a base material, or support member. The balance coating is opposite to the recording surface in order to cope with curling. The auxiliary layer is ordinarily made of a material which is substantially common to the material constituting a recording material layer. Nevertheless, curling is unavoidable due to the influence of biaxial stretching which is resultant from the production of the support plate of the sheet and the influence of subtle changes in ambient conditions in the course of production. Further, curling may occur while a core is shaped on the sheet.

Even though a curl at the production stage of the sheet may be eliminated, it may be brought about by aging of the sheet. Additionally, where such a magnetic disc is used with an electronic still camera, it is quite difficult to free the disc from curling under, for example, ordinary conditions of use of a camera, that is, a hot and humid condition to a cold and dry condition. Curling is, therefore, physically inevitable although to one angular degree or another.

For example, the curl h was actually measured to be as large as about 0.3 millimeter (mm) at the minimum and about 1.5–3 mm at the maximum even with a magnetic sheet having a balance coating thereon.

Where a magnetic sheet with such a curl is used for recording or playback purpose, rotating the sheet at, for example, 3,600 rpm is successful to somewhat straighten the curl with the aid of the centrifugal force but not sufficiently. A prior art recording and/or playback apparatus using a magnetic sheet is shown in FIG. 4 which employs a regulator plate 32 as a solution to the above-mentioned curl problem. In FIG. 4, the regulator plate 32 is semi-permanently fixed in place adjacent to the back 24 of the magnetic sheet 14 in positional correspondence with a magnetic head 30 which neighbors a recording surface 22 of the sheet 14. When the head 30 urges, or is protruded against, the sheet 14, the regulator plate 32 serves to limit the warp of the sheet 14.

An example of the regulator plate 32 is shown in a perspective view in FIG. 5 and in a section along line VI of FIG. 5 in FIG. 6. As shown, the regulator plate 32 has a flat guide surface 38 for guiding the back 24 of the sheet 14. The guide surface 38 is formed with a recess 36 in an intermediate portion thereof which is open at one end thereof.

As shown in FIGS. 7 and 8 which are respectively sections along lines VII and VIII of FIG. 4, the regulator plate 32 cooperates with the head 30 which is thrust toward the plate 32 in regulating the position of the sheet 14. Despite such regulation, however, a prior art magnetic disc cannot be straightened enough to meet the relative positional relationship requiring an accuracy on the order of, for example, 20 μm.

In practice, even if the abutting position of the sheet is limited by the urging force exerted by the coactive regulator and head, signals recorded on or reproduced from the sheet by the head develop high-frequency fluctuation of the envelope as exemplified by FIG. 9A and low-frequency fluctuation of the envelope as exemplified by FIG. 9B.

In FIGS. 9A and 9B, a video signal 50 is shown which was produced by frequency modulating (FM) a color difference signal and a luminance signal and reproduced from a magnetic disc, with respect to one rotation of the disc. FIG. 9A suggests that even the regulation relying on the coactive regulator 32 and head 30 cannot eliminate small oscillations of that surface of the disc which is engaged by the head, the oscillations being reflected particularly by the high-frequency fluctuation of the envelope 52 of the FM signal 50. Concerning the waveform shown in FIG. 9B, curling of the sheet 14 itself is reflected; if the magnetic material has orientation, its influence will be combined with the influence of curling.

We recorded and reproduced signals into and from a magnetic sheet with a large curl by using a regulator plate and a magnetic head, and found the recording surface of the magnetic sheet oscillating minutely. Such oscillation appears itself in the signal waveform as high-frequency noise.

Other factors which effect the stability of head contact as critically as the above-described curling of a magnetic disc are the mechanical accuracy of the recording and/or playback mechanism, the accuracy of the core of the disc, and whether the disc is properly chucked.

For example, even though the accuracy of a hold reference surface of a recording medium is lower than the order of 20 μm at the core of a magnetic disc, a record reference surface of the recording medium in rotation is caused to move up and down, and this effects the head contact even in the part of the disc which is regulated by the regulator plate.

An attempt may be made to set up good head contact free from the influence of curling, mechanical accuracy of the disc core, that of the recording/playback mechanism, and chucking by thrusting the head a larger amount toward the regulator plate. Such an attempt, however, increases the pressure exerted by the head on the recording surface of the magnetic sheet and, thereby, enhances the wear of the head and the disc to noticeably shorten their lives. This wear problem is especially critical when it comes to a still picture system which reproduces a still picture from a video signal recorded on a magnetic disc, inasmuch as a playback head of the system repeatedly traces a single track when the system is in a playback mode. Thus, recording and playback operations associated with this type of flexible magnetic discs have to satisfy two dilemmatic requirements:

(1) The amount of protrusion of the head has to be increased in order to achieve stable head contact; and (2) Taking into account the lives of the head and magnetic sheet as well as the need for repetitive playback, the contact pressure exerted by the head on the magnetic sheet has to be decreased.

SUMMARY OF THE INVENTION

It is therefore an object of the present invention to eliminate the drawbacks inherent in the prior art systems and provide a system and method using flexible magnetic disc which constantly insures stable and optimum abutment of a magnetic head on the recording surfce of the disc during recording or playback.

In accordance with the present invention, there is provided a flexible magnetic disc having a rotary magnetic recording medium in the form of a sheet, in which, assuming that the recording medium has a total thickness of t mm and a Young's modulus of E grams per square millimeter (g/mm$^2$), the product of the Young's modulus E and the third power of the total thickness t, i.e. $Et^3$, lies in the range between a lower limit of 2.5 g.mm and an upper limit of 36 g.mm inclusive of such upper and lower limits.

In this specification, the words "system including a regulator plate and performing recording or playback by protruding a magnetic head beyond a regulation level of a rotatable sheet of magnetic recording medium" should be understood to imply a recording or playback system which requires a regulator plate in order to attain stable contact of a head with a sheet of rotary magnetic recording medium, the diameter of which is too small (e.g. about 50 mm) to be stably engaged by the head only with the aid of a centrifugal force, by regulating warp or sway of a recording surface of the medium due to protrusion of the head.

BRIEF DESCRIPTION OF THE DRAWINGS

The objects and features of the present invention will become more apparent from a consideration of the following detailed description taken in conjunction with the accompanying drawings in which:

FIGS. 7 and 8 are sections taken respectively along lines VII and VIII of FIG. 4;

FIGS. 9A and 9B show waveforms representative of exemplary fluctuations appearing during reproduction of a signal recorded on the magnetic disc; and FIGS. 10 and 11 are views illustrative of different degrees of fit of the magnetic head with the magnetic sheet.

DESCRIPTION OF THE PREFERRED EMBODIMENT

Figure 1:
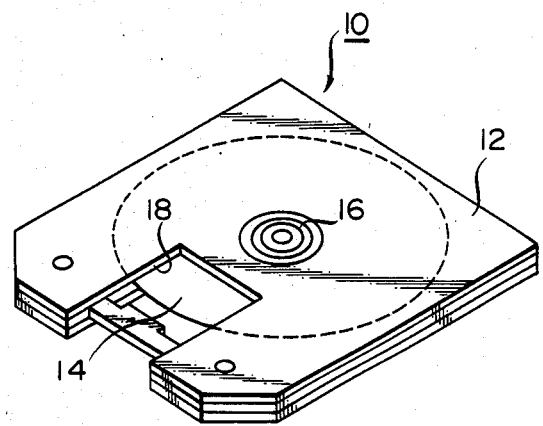
FIG. 1 is a perspective view showing an example of flexible magnetic discs.
Figure 2:
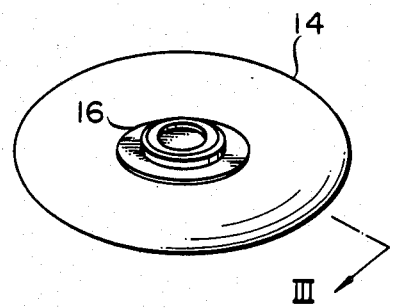
FIG. 2 is a perspective view of a magnetic sheet included in the magnetic disc shown in FIG. 1.
Figure 3:
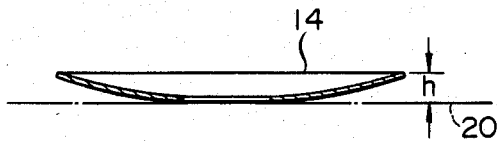
FIG. 3 is a cross-sectional view exaggeratedly representative of curling of the magnetic sheet.
Figure 4:
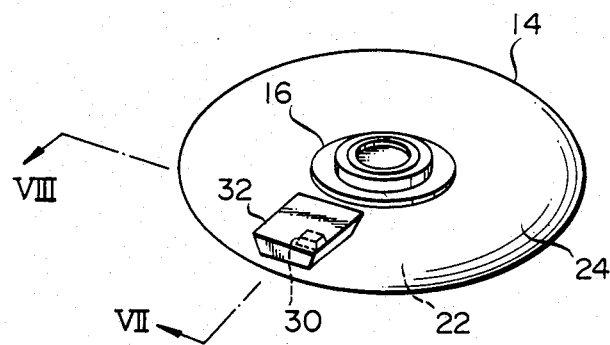
FIG. 4 is a schematic perspective view of an exemplary arrangement in which the position of the magnetic sheet is regulated by a magnetic head and a regulator plate.
Figure 5:
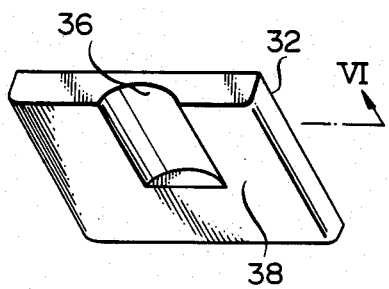
FIG. 5 is a perspective view of the regulator plate shown in FIG. 4.
Figure 6:
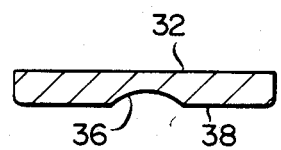
FIG. 6 is a section taken along line VI of FIG. 5.
Figure 7:
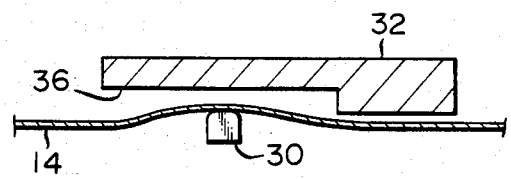

A preferred embodiment of the present invention will be described in detail hereinafter. We, in light of the previously discussed drawbacks inherent in the prior art systems and paying attention to the total thickness t of a magnetic sheet and its Young's modulus E as of an elastic member, have succeeded in setting up conditions which stably provide desirable head contact and realizing a remarkably elastic magnetic disc which satisfies the above conditions.

Experiments showed that, assuming that a magnetic sheet made up of a base material layer, or support member, and a magnetic recording material layer with or without a balance coating layer has a total thickness t the units of which is millimeters (mm) and a Young's modulus E the units of which is gram per square millimeter (g/mm$^2$), it is advantageous to so construct the magnetic sheet as to confine the product of the Young's modulus E by the third power of the total thickness t, i.e., $Et^3$, to within 2.5–36 g.mm inclusive of the upper and lower limits.

The lower limit of the above-described specific range is associated with a critical condition in which while a magnetic head is in the protruded position toward the recess of the regulator plate to hold the magnetic sheet therebetween, the magnetic sheet does not crease when rotated. The upper limit, on the other hand, represents a critical value which would insure desirable head contact even if the magnetic sheet had a curl. That is, although an acceptable extent of head contact is attainable even if the upper limit is exceeded when a curl is absent, the latitude for curling is very narrow.

In accordance with the present invention, the product $Et^3$ should preferably have a value selected from the range of 7–36 g.mm and, more preferably, the range of 12–36 g.mm, taking into account the availability of the support member, flatness of the support member, oscillation (appearing as jitter) due to rotation of the disc, etc.

The present invention eliminates the drawbacks heretofore encountered by use of a magnetic sheet which is made of a material whose Young's modulus satisfies the above condition and has a total thickness so selected as to satisfy the same condition. This may be accounted for by the following reasons.

First, so long as a magnetic sheet satisfies such a condition, an increase in the protruding amount of the head does not essentially increase the contact pressure of the head because the magnetic sheet will sway or warp by a substantial amount. This results in prolonging the life of the head and sheet.

Second, because the magnetic sheet is elastic, contact of the head is established over a substantial area of the sheet even if the head is protruded by an increased amount. In detail, where the sheet 14 is made of a relatively harder material, the contact area between the sheet 14 and the head 30 is limited as indicated by S in FIG. 10 by way of example. In such a smaller contact area S, the sheet 14 and the head 30 do not get well fit each other failing to attain a sufficient allowance for recording or reproducing signals. In contrast, the material with such elasticity and thickness which satisfy the aforementioned condition attains a relatively larger contact area S as shown in FIG. 11, so that a satisfactory fit is attained between the sheet 14 and the head 30 to offer a substantial allowance for recording or playback.

Third, because the magnetic sheet itself is thin and elastic, any curling thereof will be sufficiently removed between the magnetic head and the regulator plate. This substantially frees the head contact surface from the influence of curling.

An experiment was conducted using a magnetic disc which had a Young's modulus E of 465 kg/mm$^2$, a total thickness t of 42 $\mu$m ($Et^3 = 35.3$ g.mm), an outside diameter of 47 mm, and a curl of 1.5 mm. When the disc was played back with a head protruded by various amounts which were t to 2t with respect to the regulation level, a relatively good waveform of envelope was achieved. When played back under the same conditions as described above except to the thickness t which was 27 $\mu$m ($Et^3 = 9.89$ g.mm), an excellent waveform of envelope was achieved with hardly any influence of curling observed therein. Further, when the thickness t was 20 $\mu$m, ($Et^3 = 3.72$ g.mm), the resulted envelope was acceptable even with the curl increased to 12 mm.

For comparison purpose, a magnetic disc with a Young's modulus E of 520 kg/mm$^2$ and a total thickness t of 45 $\mu$m ($Et^3 = 47.7$ g.mm) was played back. When the curl was 1.5 mm, such a disc yielded only a poor envelope due to noticeable influence of the curl. Meanwhile, a similar disc developed a relatively good waveform of envelope when the curl was less than 1 mm.

It will be understood from the foregoing that in accordance with the present invention stable and optimum contact of a magnetic head with a magnetic sheet is achievable by use of a flexible magnetic disc made of an elastic material and having a thin magnetic sheet, compared to the prior art disc configuration. More concretely, the present invention provides a highly reliable flexible magnetic disc which frees video signals or other signals recorded on or read out of the disc from the influence of curling or oscillation of the recording surface, while insuring a long time of service of the magnetic sheet and magnetic head.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. Apparatus for recording or playback of information on a magnetic recording material comprising, in combination:

a small-sized, flexible magnetic disc including a circular base sheet of an elastic material having a surface coated with a film of said magnetic recording material to form a recording surface;

a magnetic head assembly including a magnetic head positioned, in operation, in contact with the recording surface for performing the recording or playback of said information; and a regulator plate positioned, in operation, on the other surface of said base sheet, said regulator plate having a main surface formed thereon to be, in operation, closely adjacent to the other surface of the base sheet to maintain at least a portion of said magnetic disc at a predetermined level in a direction perpendicular to the recording surface of the disc, said main surface having a recess formed opposingly to said magnetic head;

means for positioning said magnetic head so that it is protruded, in operation, beyond the predetermined level into the recess at least by an amount which is substantially equal to a total thickness of said disc, wherein, assuming that said magnetic disc has a total thickness of t millimeters (mm) and a Young's modulus of E grams per square millimeter (g/mm$^2$), a product of the Young's modulus E by the third power of the total thickness t, $Et^3$, lies in a range between a lower limit of 2.5 g.mm and an upper limit of 36 g.mm inclusive of the lower and upper limits.

2. A magnetic disc in accordance with claim 1, wherein said product lies in a range between a lower limit of 7 g.mm and an upper limit of 36 g.mm inclusive.

3. Apparatus in accordance with claim 1, wherein said product lies in a range between a lower limit of 12 g.mm and an upper limit of 36 g.mm inclusive.

4. Apparatus in accordance with claim 1, wherein said small-sized disc has a diameter of about 50 mm.

5. Apparatus in accordance with claim 2, wherein said small-sized disc has a diameter of about 50 mm.

6. Apparatus in accordance with claim 3, wherein said small-sized disc has a diameter of about 50 mm.

7. A method for recording or playback of information on a magnetic recording material comprising the steps of:

providing a small-sized, flexible magnetic disc including a circular base sheet of an elastic material having a surface coated with a film of said magnetic recording material to form a recording surface;

positioning a magnetic head assembly including a magnetic head in contact with the recording surface to perform the recording or playback of information; and positioning a regulator plate on the other surface of said base sheet, said regulator plate having a main surface formed thereon closely adjacent to the other surface of the base sheet to maintain at least a portion of said magnetic disc at a predetermined level in a direction perpendicular to the disc, said main surface having a recess formed opposingly to said magnetic head;

said positioning of the magnetic head being such as to protrude the magnetic head beyond said predetermined level into the recess at least by an amount which is substantially equal to a total thickness of said disc, wherein, assuming that said magnetic disc has a total thickness of t millimeters (mm) and a Young's modulus of E grams per square millimeter (g/mm$^2$), a product of the Young's modulus E by the third power of the total thickness t, $Et^3$, lies in a range between a lower limit of 2.5 g.mm and an upper limit of 36 g.mm inclusive of the lower and upper limits.

8. The method of claim 7, wherein said product lies in a range between a lower limit of 7 g.mm and an upper limit of 36 g.mm inclusive.

9. The method of claim 7, wherein said product lies in a range between a lower limit of 12 g.mm and an upper limit of 36 g.mm inclusive.

10. The method of claim 7, wherein said small-sized disc has a diameter of about 50 mm.

11. The method of claim 8, wherein said small-sized disc has a diameter of about 50 mm.

12. The method of claim 9, wherein said small-sized disc has a diameter of about 50 mm.

* * * * *